United States Patent
Marmur

(10) Patent No.: US 6,814,378 B1
(45) Date of Patent: Nov. 9, 2004

(54) RETRACTABLE SAFETY BUMPER APPARATUS

(75) Inventor: Lazar Marmur, Plainsboro, NJ (US)

(73) Assignee: Automated Waste Equipment Co., Inc., Trenton, NJ (US)

( * ) Notice: Subject to any disclaimer, the term of this patent is extended or adjusted under 35 U.S.C. 154(b) by 0 days.

(21) Appl. No.: 10/641,956

(22) Filed: Aug. 15, 2003

(51) Int. Cl.$^7$ .......................... B60R 19/02; B60R 19/38
(52) U.S. Cl. .......................... 293/103; 293/118; 293/142
(58) Field of Search .................... 293/103, 102, 293/118, 119, 133, 142; 296/187.01, 187.03, 187.11

(56) References Cited

U.S. PATENT DOCUMENTS

| | | | |
|---|---|---|---|
| 3,733,096 A | | 5/1973 | Kassbohrer |
| 3,847,427 A | | 11/1974 | Eshelman |
| 3,871,695 A | | 3/1975 | Koenig |
| 3,913,963 A | | 10/1975 | Persicke |
| 3,923,330 A | | 12/1975 | Viall, Sr. et al. |
| 3,992,047 A | | 11/1976 | Barenyi et al. |
| 4,359,239 A | | 11/1982 | Eggert, Jr. |
| 4,410,207 A | | 10/1983 | Scharf |
| 4,613,147 A | | 9/1986 | Kjellqvist |
| 4,979,770 A | | 12/1990 | Shal-Bar |
| 4,988,258 A | * | 1/1991 | Lutz et al. .................. 414/500 |
| 4,991,890 A | * | 2/1991 | Paulson ...................... 293/118 |
| 5,022,703 A | * | 6/1991 | Westbrook .................. 296/118 |
| 5,360,311 A | * | 11/1994 | Lutz et al. .................. 414/494 |
| 5,507,546 A | | 4/1996 | Holley |
| 5,624,143 A | * | 4/1997 | Waldschmitt ................ 293/118 |
| 5,632,518 A | | 5/1997 | Kendall |
| 5,662,453 A | * | 9/1997 | Gerstner et al. ............ 414/812 |
| 5,673,953 A | | 10/1997 | Spease |
| 6,053,691 A | | 4/2000 | Weseman |
| 6,068,329 A | | 5/2000 | Miller |
| 6,089,629 A | | 7/2000 | Hope et al. |
| 6,109,675 A | | 8/2000 | Sumrall |
| 6,116,667 A | | 9/2000 | Torcomian |
| 6,176,529 B1 | | 1/2001 | Kitzmiller et al. |
| 6,176,530 B1 | | 1/2001 | Gollungberg |
| 6,179,544 B1 | | 1/2001 | Weseman |
| 6,193,460 B1 | * | 2/2001 | Damico ...................... 414/494 |
| 6,394,734 B1 | | 5/2002 | Landoll et al. |
| 6,450,556 B1 | | 9/2002 | Jacobs |
| 6,764,116 B2 | * | 7/2004 | Ledford et al. ............. 293/102 |
| 2001/0030431 A1 | * | 10/2001 | Killday ...................... 293/118 |

FOREIGN PATENT DOCUMENTS

| | | | | |
|---|---|---|---|---|
| EP | 000298471 | * | 1/1989 | .................. 293/102 |
| JP | 352069135 | * | 6/1977 | .................. 293/103 |
| JP | 405147483 | * | 6/1993 | .................. 293/118 |
| JP | 406270750 | * | 9/1994 | .................. 293/118 |
| JP | 406286538 | * | 10/1994 | .................. 293/118 |
| JP | 406305380 | * | 11/1994 | .................. 293/118 |

* cited by examiner

Primary Examiner—D. Glenn Dayoan
Assistant Examiner—H. Gutman
(74) Attorney, Agent, or Firm—Sperry, Zoda & Kane

(57) ABSTRACT

A bumper assembly securable beneath an extended rear support bed of a vehicle wherein the bed can tilt from a horizontal orientation to a downwardly inclined position and wherein the retractable safety bumper will become retracted when the bed is in the inclined position and will be deployed for safety protection when the bed is in the horizontal position. Movement of the bumper is powered solely by a biasing device such as a spring used in combination with gravitational forces exerted upon the bumper assembly for properly coordinating movement thereof between the deployed and the retracted position with movement of the bed between the horizontal and the inclined position.

18 Claims, 6 Drawing Sheets

RETRACTABLE SAFETY BUMPER APPARATUS

BACKGROUND OF THE INVENTION

1. Field of the Invention

The present invention deals with the field of devices for underride protection. Many trucks and trailers include rear bumpers which are significantly higher than the other vehicles currently found on the highway. As a result, during accidents the other vehicles tend to ride under the rear of the trailer or the rear of the truck when colliding therewith.

Such underriding is a very dangerous occurrence because the upper portion of the smaller vehicle can be severely damaged and persons therein can be injured very significantly. The positioning of bumpers extending downwardly from the rear of trucks and trailers called safety bumpers which have been required by the Interstate Commerce Commission in recent years greatly decrease this danger.

A unique problem occurs, however, with those trucks or trailers which include an extended rear support bed which is movable between a horizontal position for transport and the downwardly inclined position to facilitate loading and unloading thereof. A sub-class of such devices include rolloff designs which move between the horizontal position for transporting containers and the downwardly inclined position for loading and unloading thereof. The use of an underride bumper with vehicles having a movable extended rear support bed is a significant problem since the underride bumpers normally extend downwardly therefrom and would contact the ground prior to the extended rear support bed reaching the fully downwardly inclined position in contact with the ground. As such, these safety bumpers need to be retractable. The present invention provides a unique automated retractable safety bumper which is movable to a retracted position when the extended rear support bed is moved to the downwardly inclined position and is moved to a deployed position when the extended rear support bed of a vehicle is moved to the horizontal position. This movement is caused by a biasing means such as a spring carefully adjusted such that in combination with the gravitational forces on the bumper will cause proper coordinated movement thereof responsive to the selected positioning of the extended rear support bed. Preferably the bumper apparatus includes a bumper assembly which is pivotally mounted with respect to a main bracket and the position of the pivotal mount and the configuration of the bumper assembly is chosen along with the forces of the resilient biasing means or spring in such a manner as to assure such proper coordinated movement.

2. Description of the Prior Art

The concept of the above-identified invention wherein a safety bumper for underride protection is automatically retractable, is a novel concept not shown or suggested in the prior art. Other prior art patents, however, have been granted on similar underride and protected bumper configurations having different structures and embodiments such as shown in U.S. Pat. No. 3,733,096 patented May 15, 1973 on a "Bumper Device" to Karl Kassbohrer and assigned to Karl Kassbohrer Fahrzengwerke GmbH; and U.S. Pat. No. 3,847,427 patented Nov. 12, 1974 on a "Shiftable Shock Absorbing Tire Buffer" to Cheston Lee Eshelman; and U.S. Pat. No. 3,871,695 patented Mar. 18, 1975 on a "Folding Truck Bumper" to Robert W. Koenig; and U.S. Pat. No. 3,913,963 patented Oct. 21, 1975 on a "Shock Or Energy Absorbing Apparatus" to Gunter Persicke and assigned to Road Research Limited; and U.S. Pat. No. 3,923,330 patented Dec. 2, 1975 on a "Articulated Bumper" to Charles S. Viall, Sr. et al; and U.S. Pat. No. 3,992,047 patented Nov. 16, 1976 on a "Motor Actuated Shiftable Supplemental Bumper" to Bela Barenyi et al and assigned to Daimler-Benz Aktiengesellschaft; and U.S. Pat. No. 4,359,239 patented Nov. 16, 1982 on a "Underride Device For A Trailer Or Truck" to Walter S. Eggert, Jr. and assigned to The Budd Company; and U.S. Pat. No. 4,410,207 patented Oct. 18, 1983 on a "Bumper Structure For Vehicle Having Tiltable Load Carrier Member" to Heino W. Scharf and assigned to Dempster Systems Inc.; and U.S. Pat. No. 4,613,147 patented Sep. 23, 1986 on a "Rear Underride Bumper And Side-Draft Support" to Gusta Kjellqvist and assigned to AB Mahler & Soner; and U.S. Pat. No. 4,979,770 patented Dec. 25, 1990 on a "Bumper Having Pivotal Bumper Bar For Heavy Mechanized Vehicles" to Dan J. Shal-Bar; and U.S. Pat. No. 5,507,546 patented Apr. 16, 1996 on an "Underride Protection Bumper" to John D. Holley; and U.S. Pat. No. 5,632,518 patented May 27, 1997 on a "Rear Impact Trailer Guard" to Donald H. Kendall and assigned to The United States Of America As Represented By The Secretary Of The Army; and U.S. Pat. No. 5,673,953 patented Oct. 7, 1997 on a "Breakaway ICC Bumper" to Donald R. Spease; and U.S. Pat. No. 6,053,691 patented Apr. 25, 2000 on "Automatic Underride Protection For Tilt Trailers" to Brian H. Weseman and assigned to Towmaster, Inc.; and U.S. Pat. No. 6,068,329 patented May 30, 2000 on a "Rear-Impact Underride Protection" to Terrance L. Miller and assigned to Wenger corporation; and U.S. Pat. No. 6,089,629 patented Jul. 18, 2000 on a "Underrun Guard For Road Vehicles" to Frederick John Charles Hope et al and assigned to Hope Technical Sales and Services Ltd.; and U.S. Pat. No. 6,109,675 patented Aug. 29, 2000 on a "Hinged Member For Rear Impact Guard" to Doyle Sumrall and assigned to Waltco Truck Equipment Co.; and U.S. Pat. No. 6,116,667 patented Sep. 12, 2000 on a "Trailer Underride Crash Guard" to Albert Torcomian; and U.S. Pat. No. 6,176,529 patented Jan. 23, 2001 on a "Torsional Under-Ride Guard" to James A. Kitzmiller et al and assigned to Henschen div. of QDS Components; and U.S. Pat. No. 6,176,530 patented Jan. 23, 2001 on a "Device For Underrun Protection In Vehicles" to Peter Gollungberg and assigned to Volvo Lastvagnar AB; and U.S. Pat. No. 6,179,544 patented Jan. 30, 2001 on "Underride Protection" to Brian Weseman and assigned to Towmaster, Inc.; and U.S. Pat. No. 6,394,734 patented May 28, 2002 on a "Trailer Having Actuatable Tail Ramp" to Donald R. Landoll et al; and U.S. Pat. No. 6,450,556 patented Sep. 17, 2002 on a "Under-Ride Protection Airbag System And Method of Its Use" to Tony J. Jacobs and assigned to Lifesavers LLC.

SUMMARY OF THE INVENTION

The present invention provides a retractable safety bumper apparatus which is particularly usable with the vehicle having an extended rear support bed which is movable between a horizontal position for facilitating transport thereupon and a downwardly inclined position for facilitating loading and unloading thereof.

The configuration of the retractable safety bumper apparatus preferably includes a main bracket which is fixedly secured to the extended rear support bed of the vehicle and extends downwardly therefrom. This main bracket is preferably movable with the extended rear support bed between a horizontal position and the downwardly inclined position. The main bracket preferably is configured to include a base section fixedly mounted to the extended rear support bed as well as a first side panel secured to the base section and extending downwardly therefrom. The first side panel also preferably defines a first aperture extending therethrough. A second side panel is preferably also secured to the base section at a location spatially distant from the first side panel such that it extends downwardly therefrom. This second side panel will preferably define a second aperture therewithin. The first side panel and the second side panel together will define a pivotal zone therebetween. A pivot pin means may also be included extending through the first aperture means and through the second aperture means to facilitate pivotal movement relative thereto. This pivot pin means can comprise two separate pins, one extending through the first aperture and one extending through the second aperture if so desired.

The retractable safety bumper apparatus further includes a bumper assembly which is pivotally mounted with respect to the main bracket. The bumper assembly is preferably pivotally movable relative to the main bracket between a deployed position extending downwardly and away therefrom and a retracted position extending longitudinally adjacent therebeneath. The bumper assembly is preferably adapted to pivot to the deployed position responsive to positioning of the main bracket in the horizontal position. The bumper assembly is preferably pivotally movably mounted with respect to the main bracket within the pivotal zone defined between the first and second side panels. The bumper assembly is preferably attached with respect to the pivot pin to facilitate pivoting movement thereof relative to the main bracket. The bumper assembly is also urged to move to the deployed position responsive to gravitational force being exerted thereupon responsive to movement of the extended rear support bed to the horizontal position.

The bumper assembly further preferably includes a bumper support arm pivotally attached with respect to the main bracket and extending outwardly therefrom. Also included is a bumper bar fixedly secured to the bumper support arm to be pivotally movable therewith and extend generally horizontally beneath the extended rear support bed in order to provide underride protection therebeneath. The bumper assembly also preferably will include a bumper support strut fixedly secured to the bumper support arm and extending outwardly away therefrom. The bumper support strut is preferably pivotally secured with respect to the main bracket to provide relative pivotal movement between the bumper assembly and the main bracket. It also facilitates movement of the bumper assembly selectively to the deployed position responsive to the exertion of gravitational forces on the bumper assembly.

The retractable safety bumper apparatus of the present invention further includes a biasing means secured with respect to the main bracket and with respect to the bumper assembly which is adapted to exert force on the bumper assembly for urging movement thereof toward the retracted position. This biasing means preferably comprises a main spring. This main spring biasing means is adapted to urge movement of the bumper assembly to the retracted position responsive to movement of the main bracket to the downwardly inclined position. Preferably the main spring biasing means is attached with respect to the main bracket and attached with respect to the bumper assembly for the purpose of urging the bumper assembly to pivot toward the retracted position extending longitudinally beneath the extended rear support bed and thereadjacent. It is also responsive to the extended rear support bed being in the downwardly inclined position with the gravitational force exerted upon the bumper being less than the force exerted thereupon by the main spring biasing means to facilitate movement of the bumper assembly to the retracted position. Also responsive to the extended rear support bed being in the horizontal position the gravitational forces exerted upon the bumper assembly will be greater than the force exerted thereupon by the main spring biasing means and in this manner will facilitate movement of the bumper assembly to the deployed position.

The invention may optionally further include an adjustment mechanism operatively connected to the main biasing spring means for controlling the force exerted therefrom. This adjustment construction provides a unique capability and is positioned preferably between the main spring and the bumper assembly to facilitate varying of the relative positioning therebetween to provide adjustment of the force exerted by the main spring between the main bracket and the bumper assembly for the purpose of accurately controlling movement of the bumper assembly between the deployed position and the retracted position in a responsive and coordinated manner relative to the extended rear support bed being movable between the horizontal position for transport and the downwardly inclined position for facilitating loading and unloading.

It is an object of the present invention to provide a retractable safety bumper apparatus which is usable with a truck or trailer vehicle having an extended rear support bed movable between a horizontal position for transport and a downwardly inclined position for loading and unloading.

It is an object of the present invention to provide a retractable safety bumper apparatus which provides automatic underride protection for vehicles with extended rear support beds.

It is an object of the present invention to provide a retractable safety bumper apparatus which is particularly usable for providing underride protection for vehicles having an extended rear support bed movable between a horizontal position for transport and a downwardly inclined position for loading and unloading such as rollback truck and trailer configurations.

It is an object of the present invention to provide a retractable safety bumper apparatus which is easy to adjust to maintain proper coordinated movement thereof responsive to movement of an extended rear support bed to a downwardly inclined position.

It is an object of the present invention to provide a retractable safety bumper apparatus which automatically deploys responsive to an extended rear support bed being in a horizontal position which automatically retracts responsive to an extended rear support bed being in a downwardly inclined position.

It is an object of the present invention to provide a retractable safety bumper apparatus which includes no electrical powering components whatsoever.

It is an object of the present invention to provide a retractable safety bumper apparatus which is powered solely by gravitational force on the moment arm of a bumper assembly which is pivotally mounted with respect to a main bracket in combination with forces exerted therebetween by a biasing means.

It is an object of the present invention to provide a retractable safety bumper apparatus wherein the forces exerted by a main spring biasing means are adjustable to assure proper coordinated movement of the bumper assembly relative to the vehicle extended rear support bed.

It is an object of the present invention to provide a retractable safety bumper apparatus which includes a minimal number of moving parts.

It is an object of the present invention to provide a retractable safety bumper apparatus which is easily and conveniently maintained.

It is an object of the present invention to provide a retractable safety bumper apparatus which does not require any external electrical or hydraulic power takeoff mechanisms for operation thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 5A - 0 degrees; FIG. 5B - 30 degrees; FIG. 5C - 40 degrees; and FIG. 5D - 48 degrees; FIG. 6A - 48 degrees: FIG. 6B - 23 degrees; FIG. 6C - 20 degrees; and FIG. 6D - 0 degrees.

DETAILED DESCRIPTION OF THE PREFERRED EMBODIMENT

Figure 1:
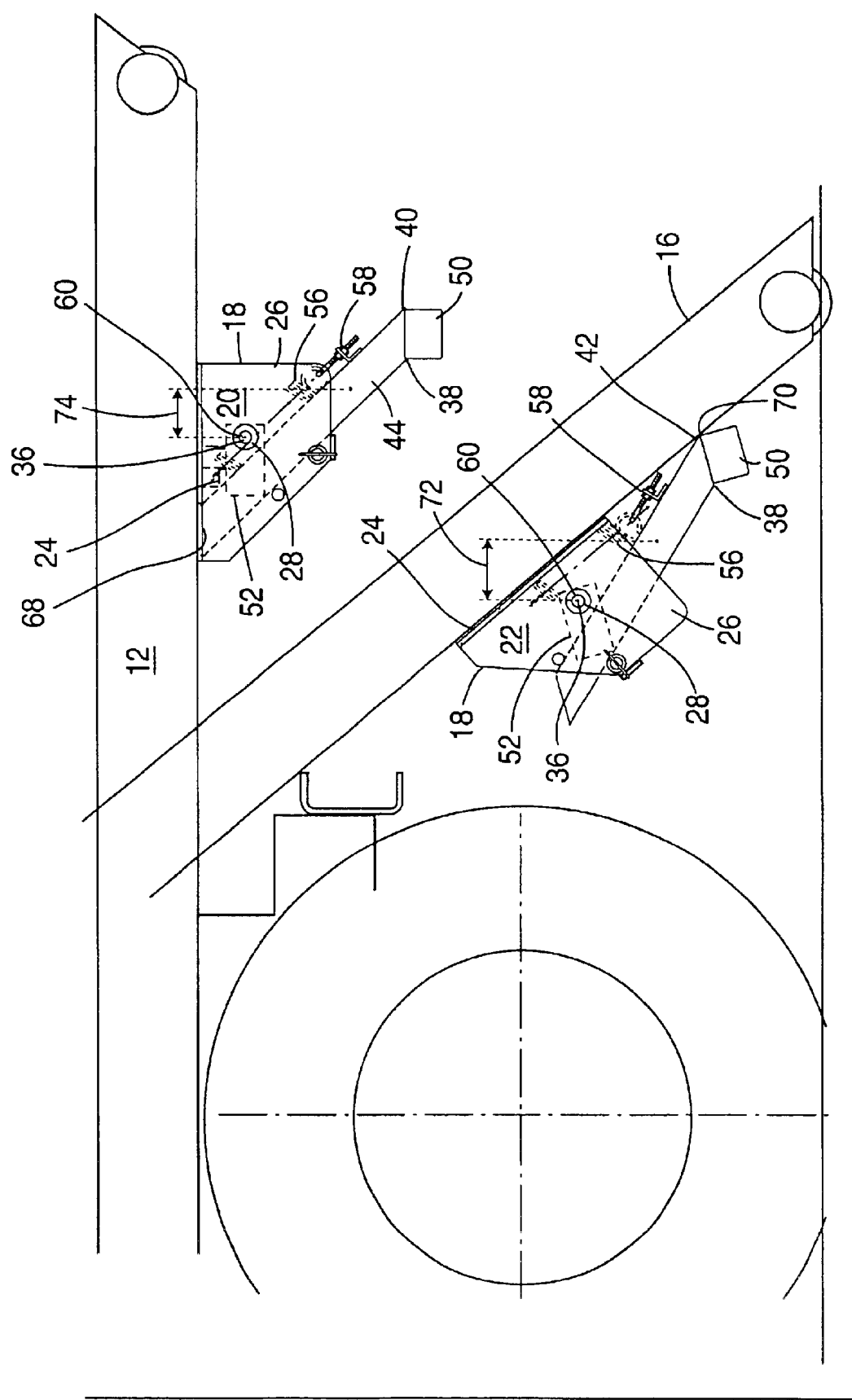
FIG. 1 is a side plan perspective illustration of the retractable safety bumper apparatus of the present invention shown attached beneath an extended rear support bed in both the horizontal position with the bumper deployed and in the downwardly inclined position with the bumper retracted.

The present invention is usable with a vehicle 10 which includes an extended rear support bed 12 movable between the horizontal position 14 for carrying a payload and a downwardly inclined position. 16 for loading and unloading of such loads. Such a vehicle 10 can usually comprise a trailer or truck body which includes a rear support bed 12 which can tilt between the downwardly inclined position 16 and the horizontal position 14. This configuration is commonly found in "rolloff" truck and trailer designs which are often used for the purpose of transporting, loading and unloading of containers and other receptacles for trash and other products.

Underride protection is an important aspect of such vehicles 10. Normally these vehicles are rather large and, as such, the rear bumper is relatively high from the ground when compared with other vehicles commonly on the highway. Damage which results from accidents from such common vehicles and trucks or trailer vehicles 10 having a very high rear bumper can be significantly reduced by providing of a safety bumper extending therebelow. Such safety bumpers have been required by the Interstate Commerce Commission in regard to certain truck and trailer configurations. Such bumpers extend downwardly from the vehicle 10 for the purpose of preventing a car impacting thereagainst from sliding under the trailer and thereby greatly minimizing the damage to the other vehicle.

The present invention relates specifically to such safety bumpers and particularly the use of such safety bumpers with truck or trailer vehicles 10 having an extendable rear support bed 12 which can tilt downwardly to facilitate loading and unloading thereof. The present invention provides an apparatus which automatically deploys and stores the safety bumper responsive solely to the positioning of the extended rear support bed 12 without requiring any external powering thereof or power takeoff system and utilizes no electrical motor or hydraulic pressure for powering movement thereof.

The configuration of the retractable safety bumper apparatus of the present invention includes a main bracket 18 which is preferably fixably secured to the undersurface of the extended rear support bed 12. This main bracket 18 preferably includes a base section 24 fixedly secured to the extended rear support bed 12 along with a first side panel 26 extending downwardly therefrom. A second side panel 30 extends downwardly from the base section at a position spaced from the first side panel 26 to define therebetween a pivotal zone 34. This pivotal zone 34 is for the purpose of receiving and allowing pivoting of a bumper configuration positioned extending therewithin.

First side panel 26 preferably defines a first aperture 28 therewithin and second side panel 30 preferably defines a second aperture 32 therewithin.

In the preferred configuration the main bracket 18 of the present invention is movable between a horizontal position 20 when the extended rear support bed 12 is in the horizontal position 14 and a downwardly inclined position 22 when the extendable rear support bed 12 is in the downwardly inclined position 16.

A bumper assembly 38 is pivotally secured preferably with respect to the main bracket 18. Pivotal movement of the bumper assembly 38 preferably occurs within the pivot zone 34 defined between the first side panel 26 and the second side panel 30. The bumper assembly 38 is movable between a deployed position 40 wherein the bumper thereof is fully deployed for providing safety against underride in automotive accidents and a retracted position 42 for storage of the bumper assembly 38. Preferably bumper assembly 38 is pivotally mounted with respect to the main bracket 18 by being attached with respect to a first pivot pin 36 positioned within the first aperture 28 of the first side panel 26. Similarly the bumper assembly 38 is preferably attached with respect to a second pivot pin 37 which is mounted within the second aperture 32 of the second side panel 30. With this configuration the bumper assembly 38 will be easily movable pivotally between the deployed position 40 and the retracted position 42 as needed and automatically.

The bumper assembly 38 preferably includes at least one bumper support arm 44 which is positioned within the pivotal zone 34 for facilitating movement between the deployed position 40 and the retracted position 42.

Figure 4:
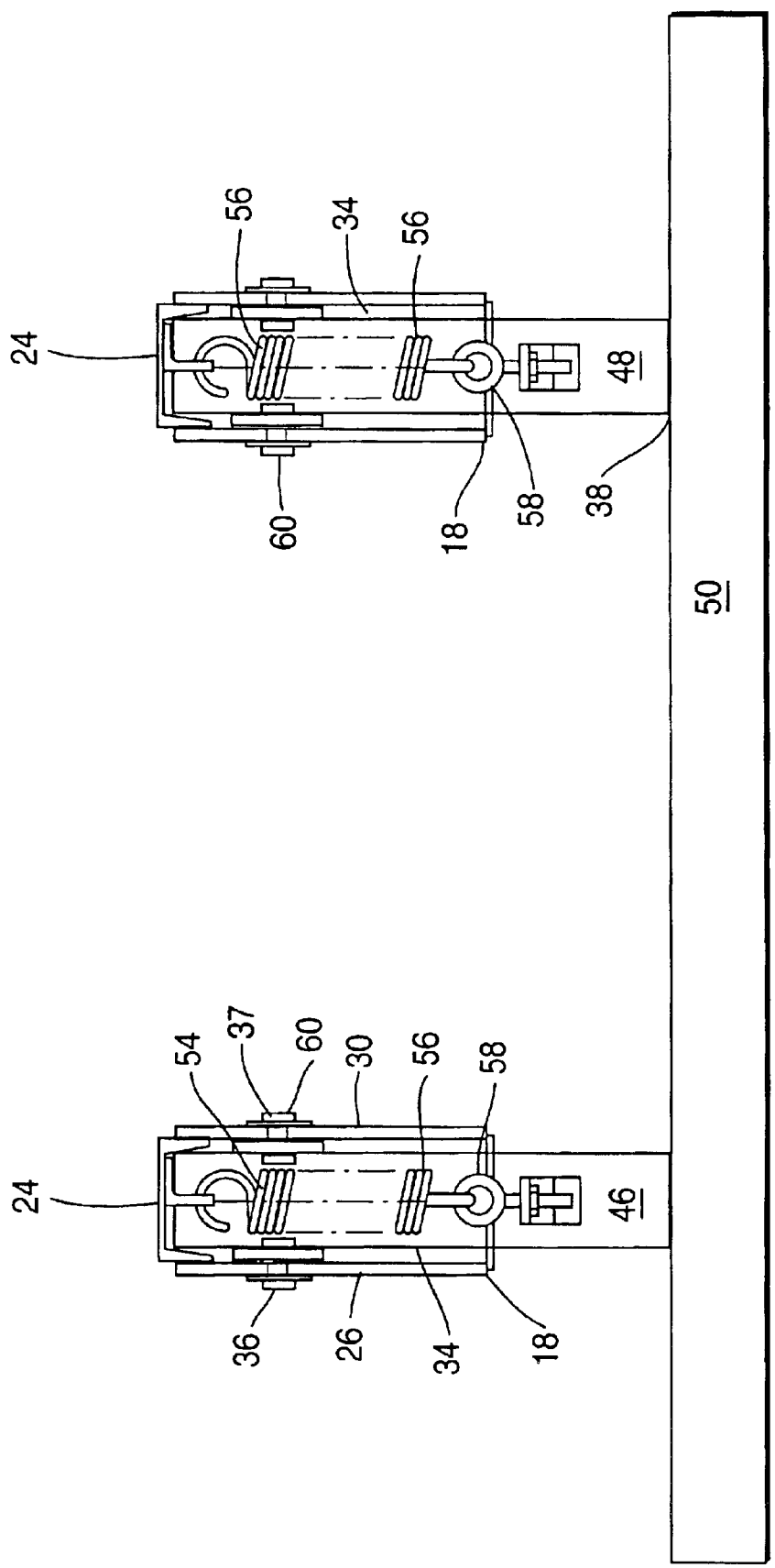
FIG. 4 is a top plan view of the present invention showing the bumper bar extending between two separately defined bumper support arms 46 and 48.

Preferably there are two separate bumper support arms shown as the first bumper support arm 46 and the second bumper support arm 48. These are shown best in FIG. 4.

Figure 5A:
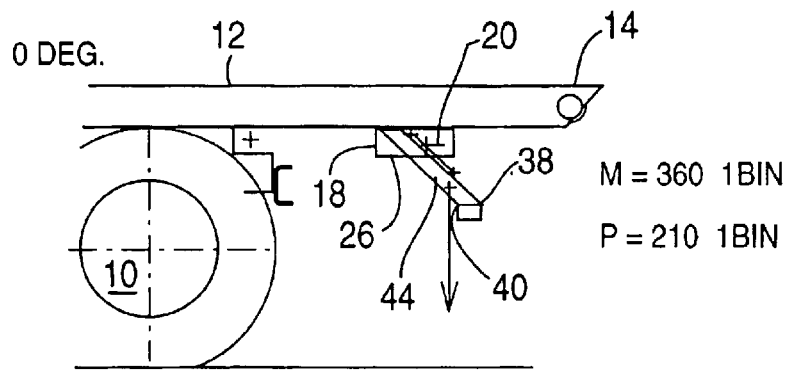
FIGS. 5A, 5B, 5C and 5D show movement of the extended rear support bed of a vehicle in steps going from the horizontal position to the downwardly inclined position and the coordinated responsive movement of the retractable safety bumper mounted thereunder between the deployed position and the retracted position. The horizontal orientation of the extended rear support bed in each of these figures is as follows.

These two support arms are each fixedly secured with respect to a bumper bar 50 which extends generally horizontally therebetween. Pivotal movement of the first and second bumper support arms 46 and 48 between the deployed position 40 and the retracted position 42 of the bumper assembly 38 facilitates movement of the horizontally extending bumper bar 50 between the deployed position spatially distant below the extended rear support bed 12 and upwardly in abutment with the undersurface of the extended rear support bed 12 which comprises the retracted position 42 thereof. These two positions are both shown in FIG. 1. Furthermore the retracted position 42 of the bumper assembly 38 is shown in FIGS. 6A and 5D whereas the deployed position 40 of bumper assembly 38 is best shown in FIGS. 5A and 6D.

To facilitate the exertion of gravitational force upon the pivotally mounted bumper assembly 38 a bumper support strut 52 may be secured to the bumper support arm 44 fixedly and may be pivotally secured with respect to the pivot means 36 and 37.

Control of positioning of the bumper assembly 38 between the deployed position 40 and the retracted position 42 thereof is further achieved by the inclusion of a biasing means 54. Preferably biasing means 54 comprises a main spring 56 which is attached to the bumper assembly 38 and to the main bracket 18. The main spring biasing means 56 urges movement of the bumper assembly 38 toward the retracted position. However, when the extended rear support bed 12 is moved toward the horizontal position 14 as shown best in FIGS. 1, 5A and 6D, the gravitational forces will exceed the predefined force of the spring and allow the bumper assembly 38 to move to the deployed position 40.

Figure 2:
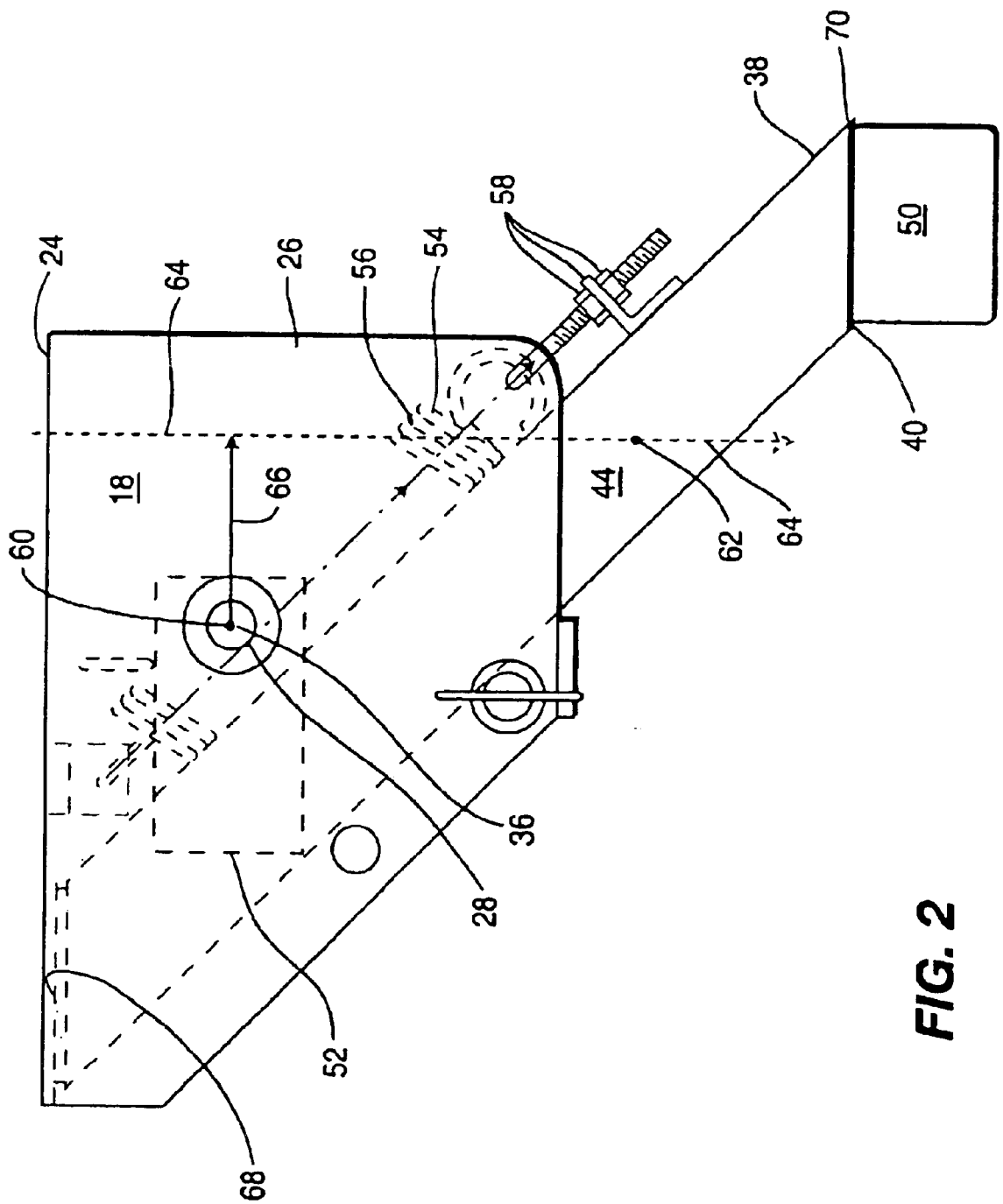
FIG. 2 is a closeup of the retractable safety bumper apparatus of the present invention shown in the deployed position.
Figure 3:
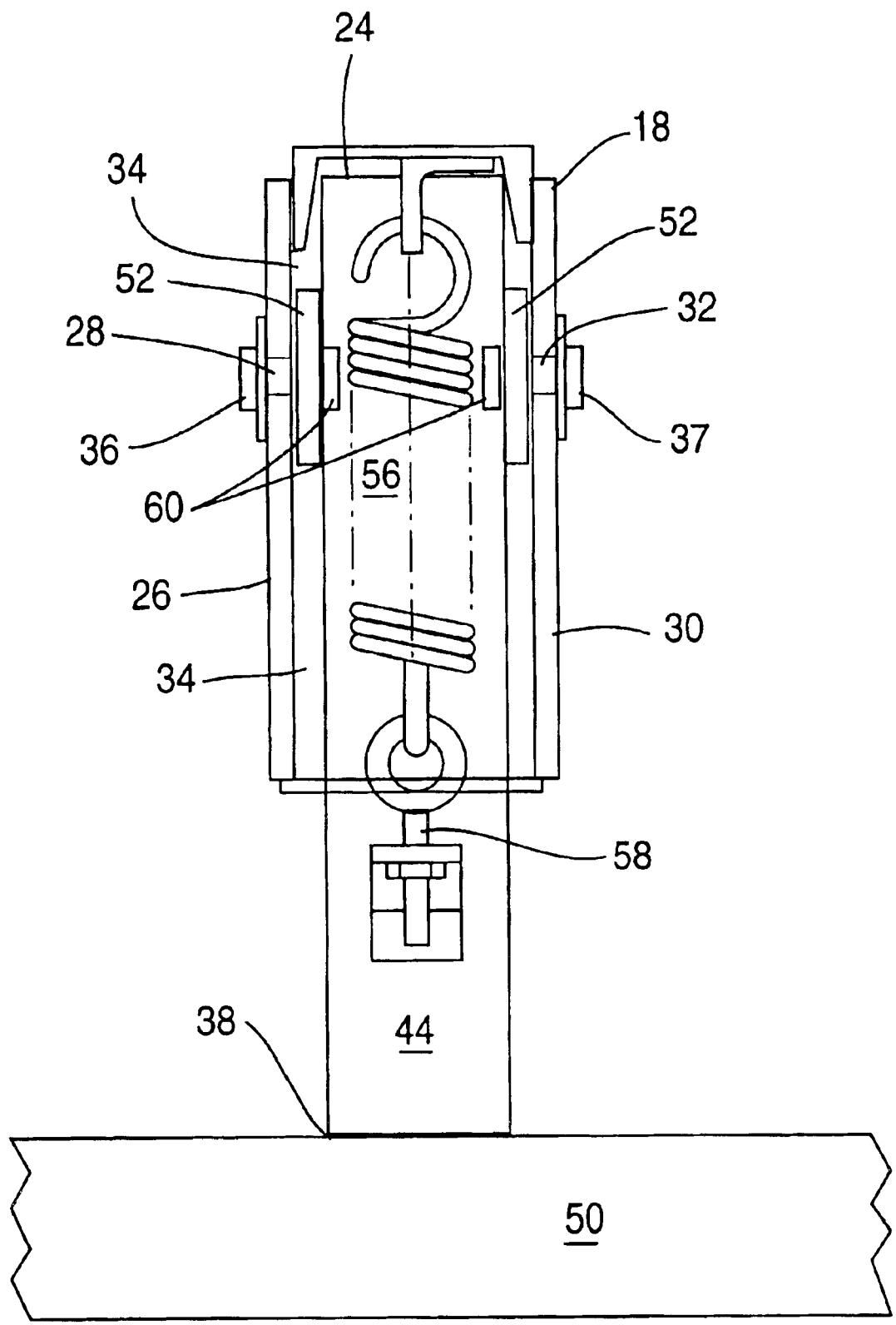
FIG. 3 is a top plan view of an embodiment of the present invention.

The careful adjustment of the amount of force being exerted between the bumper assembly 38 and the main bracket 18 is an important characteristic of the present invention. The amount of force will vary depending on the size and choice of the spring but there still must be some form of fine adjustment and, as such, an adjustment means 58 is preferably provided. This adjustment means 58 as best shown in FIGS. 2 and 3 can comprise an eye bolt secured to the end of the spring which is attached to the bumper assembly 38 which eye bolt includes a threaded section which allows a variation in the relative positioning between the bumper assembly 38 and the main spring 56. In this manner the amount of tension exerted between the bumper assembly 38 and the main bracket 18 can be increased or decreased to maintain proper coordinated movement of the bumper assembly 38 between the deployed and retracted positions 40 and 42 responsive to movement of the extended rear support bed 12 between the horizontal position 14 and the downwardly inclined position 16.

An important characteristic of the present invention is the positional relationship between the pivot 60 of the first pivotal pin 36 and the second pivotal pin 37 and the center of gravity 62 of the bumper assembly. Since the bumper assembly 38 is pivotally mounted with respect to the pivot 60 the positioning of the center of gravity 62 thereof is extremely important. As shown best in FIG. 1 the horizontal distance between the center of gravity 62 of bumper assembly 38 and the pivot 60 defines a gravitational force moment arm 66. At all times the bumper gravitational force vector 64 will be exerted directly downwardly on the bumper assembly 38 through the center of gravity 62 thereof. Thus the horizontal component of the distance between the pivot means 60 and the bumper gravitational force vector 64 will be defined as the gravitational force moment arm. This distance results from gravity acting vertically downwardly on the center of gravity 62 of the bumper assembly 38.

Figure 5B:
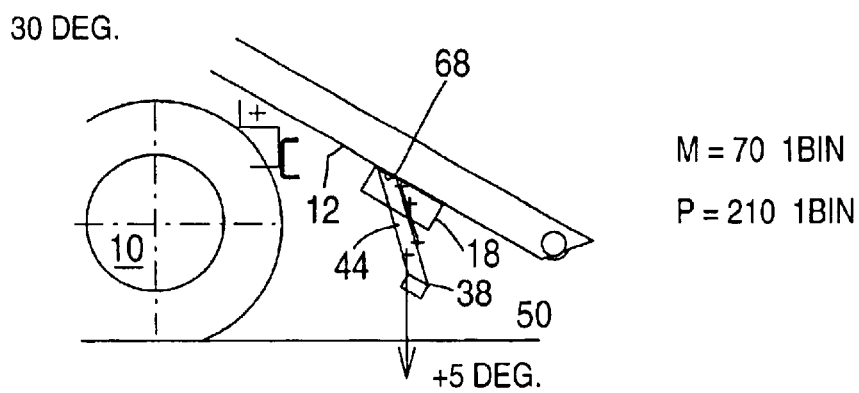
Figure 5C:
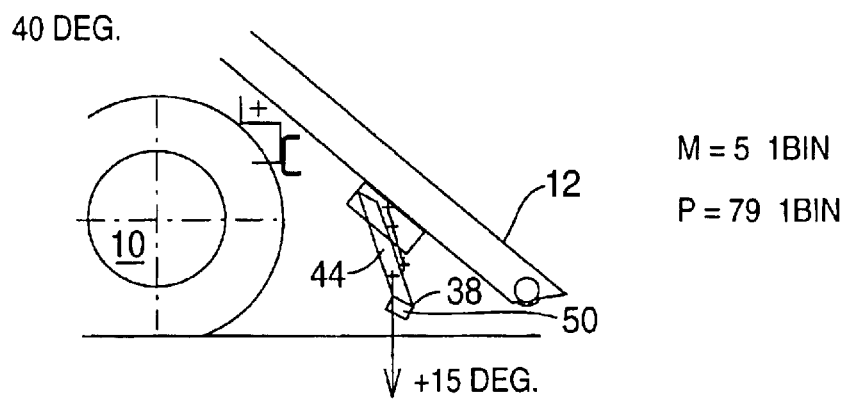
Figure 5D:
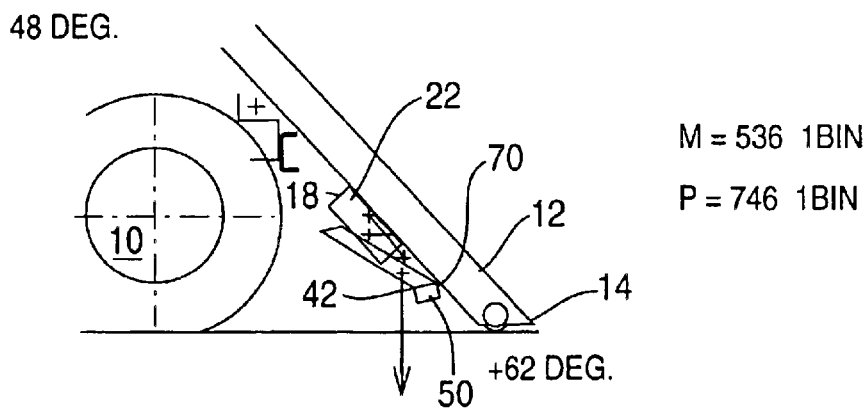
Figure 6A:
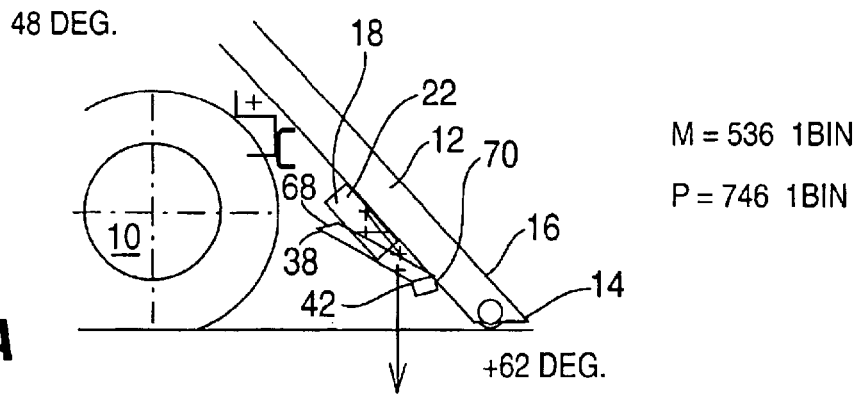
FIGS. 6A, 6B, 6C and 6D show four different stages of movement of the extended rear support bed between the downwardly inclined position and moving toward the horizontal position with the retractable safety bumper apparatus shown with coordinated movement between the retracted position and the deployed position. The horizontal orientation of the extended rear support bed in each of these figures is as follows.

The movement of the extended rear support bed 12 from the horizontal position 14 to the downwardly inclined position 16 is shown in FIGS. 5A through 5D. In particular 5A shows the initial position of the extended rear support bed 12 in the horizontal position 14 prior to downward movement thereof. In this position as shown in FIG. 5A the bumper assembly will be in the deployed position 40 for protecting against underride collisions. With a rolloff or other similar design, as the extended rear support bed 12 starts to pivot toward the downward position, the movement of the bumper assembly 38 toward the retracted position 42 will be initiated. FIG. 5B shows the extended rear support bed 12 angled downwardly at 30 degrees. FIG. 5C shows the extended rear support bed 12 angled downwardly at 40 degrees and the initiation of counterclockwise pivotal movement of the bumper assembly 38 toward the retracted position 42. FIG. 5D shows the final position with the extended rear support bed 12 positioned in the fully inclined approximately 48 degree position with the bumper assembly 38 moved completely to the retracted position 42. This is important because, if the bumper assembly 38 were to be fixed and to be allowed to be maintained in the deployed position 40 at all times, it would impact the ground and interfere with the ability of the extended rear support bed 12 to reach the fully downwardly inclined position 16 because the bumper assembly 38 would impact the ground prior to the extended rear support bed 12 impacting the ground. As such, it is important that a means be provided for allowing movement and, in this case, automatic movement of the bumper assembly 38 to the retracted position 42 responsive to movement of the extended rear support bed 12 to the downwardly inclined position 16.

Figure 6B:
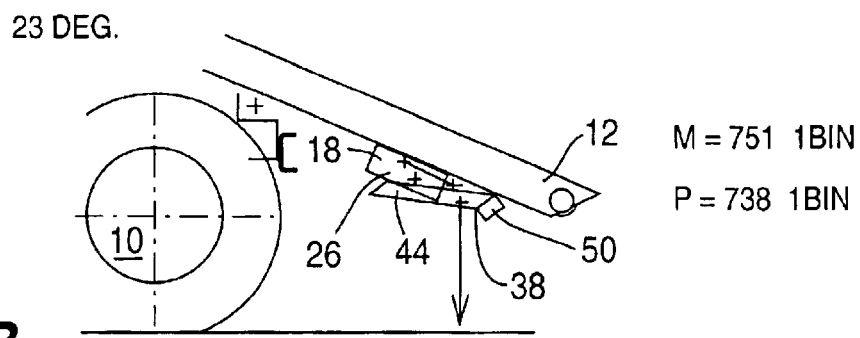
Figure 6C:
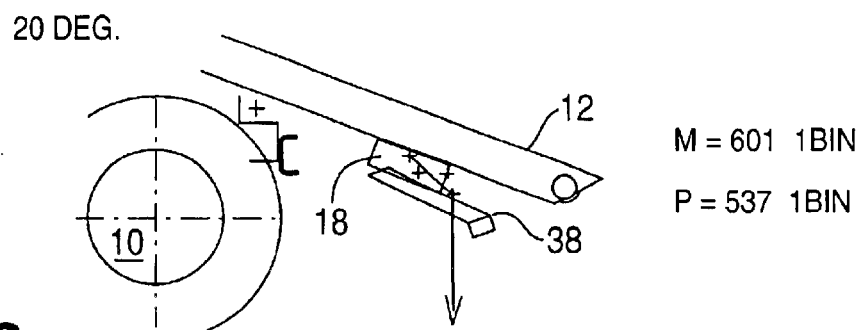
Figure 6D:
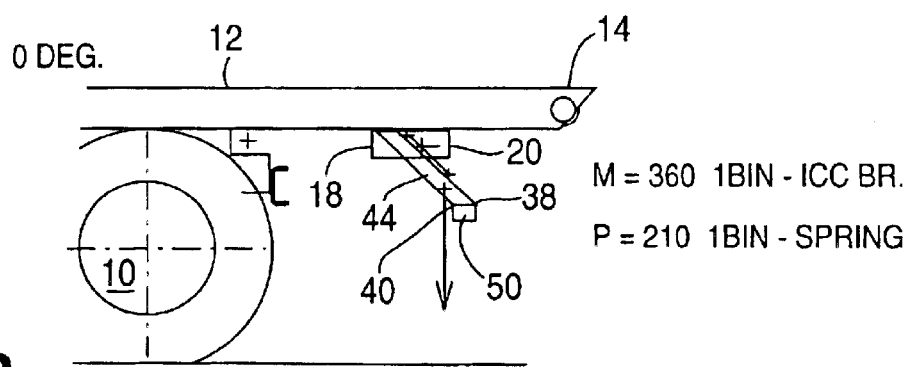

Similarly FIGS. 6A through 6D show the cycle of movement of the bumper assembly 38 from the retracted position 42 shown in FIG. 6A to the deployed position 40 shown in FIG. 6D responsive to movement of the extended rear support bed 12 from the downwardly inclined position 16 to the horizontal position 14. In particular FIG. 6A shows the extended rear support bed 12 at the fully downwardly inclined position 16 which is approximately 48 degrees from horizontal. In this position the bumper assembly 38 is fully retracted in the retracted position 42. FIG. 6B shows an intermediate step in movement of the extended rear support bed 12 upwardly from the horizontal position to approximately 23 degrees with respect to horizontal and pivotal movement of the bumper assembly 38 is not yet initiated. FIG. 6C does show movement of the extended rear support bed 12 upwardly to a position approximately 20 degrees from horizontal and shows the initiation of movement of the bumper assembly 38 from the retracted position 42 part way toward the deployed position 40. Finally FIG. 6D shows the extended rear support bed 12 in the fully horizontal position 14 at zero degrees and shows that the bumper assembly 38 has moved completely to the deployed position 48 extending downwardly therefrom for providing underride protection.

It is important to appreciate that the gravitational force exerted through the bumper gravitational force vector 64 as shown best in FIG. 2 will vary as the positioning and orientation of the retractable safety bumper apparatus of the present invention changes and moves responsive to movement of the extended rear support bed 12 between the horizontal position 14 and the downwardly inclined position 16. As shown best in FIG. 1 the length 72 of the gravitational force movement arm 66 with the bumper retracted will be significantly greater than the length 74 of the gravitation force moment arm 66 with the bumper in the deployed position. This is because the horizontal component of the distance between the pivot 60 and the center of gravity 62 of the bumper assembly 38 will be significantly less when the extended rear support bed 12 is in the horizontal position 14 and greater when the extended rear support bed 12 is in the downwardly inclined position 16. By carefully and accurately choosing the force capable of being exerted by the main spring biasing means 56 the gravitation force exerted along the moment arm 66 will be sufficient to pivot the bumper assembly 38 to the deployed position responsive to the extended rear support bed 12 being in the horizontal position 14 while, on the other hand, the gravitation force exerted through the gravitation force moment arm 66 will not be enough to pivot the bumper assembly 38 to the deployed position responsive to the extended rear support bed 12 being in the downwardly inclined position 16 thereby allowing the bumper assembly 38 to pivot to the retracted position 42. As such, a system with automatic self-controlled movement which does not require any external powering such as through power takeoff, hydraulic or electric motor means is provided which assures that the bumper 38 will be fully deployed when the extended rear support bed 12 is in the horizontal position and fully retracted when the extended rear support bed 12 is in the downwardly inclined position 16.

To limit the extent of movement of the bumper assembly 38 stop surfaces 68 and 70 will be provided. In particular deployed stop surface 68 is defined on the bumper assembly 38 to be brought in contact with the base section 24 whenever the bumper assembly 38 is caused to move to the deployed position 40. This deployed stop surface 68 upon contact with the base section 24 of main bracket 18 will limit any further movement of the bumper assembly 38 relative to the main bracket 18. Similarly the retracted stop surface 70 defined on the bumper assembly 38 will be brought in contact with the undersurface of the extended rear support bed 12 responsive to the bumper assembly 38 being in the retracted position 42 to limit any further movement thereof relative to the main bracket. The deployed stop surface 68 and the retracted stop surface 70 are best shown in FIG. 1.

As such, the present invention provides a unique configuration where an automatically movable retractable safety bumper apparatus for providing an ICC (Interstate Commerce Commission) or underride protection bumper which is completely adjustable and automatically moves to the deployed position during transport and to the storage position during loading and unloading of a vehicle having an extended rear support bed which is movable between the horizontal position for transport and a downwardly inclined position for loading and unloading.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A retractable safety bumper apparatus for use with a vehicle having an extended rear support bed movable between a horizontal position for transport and a downwardly inclined position for loading and unloading, said retractable safety bumper apparatus comprising:

A. a main bracket means fixedly secured to the extended rear support bed of the vehicle and extending downwardly therefrom, said main bracket means being movable with the extended rear support bed between a horizontal position thereof and a downwardly inclined position thereof;

B. a bumper assembly pivotally mounted with respect to said main bracket means to be pivotally movable with respect thereto between a deployed position extending downwardly and away therefrom and a retracted position extending longitudinally adjacent therebeneath, said bumper assembly adapted to pivot to the deployed position responsive to positioning of said main bracket means in the horizontal position, said bumper assembly being urged to move to the deployed position by gravitational force exerted thereupon responsive to movement of the extended rear support bed to the horizontal position; and C. a biasing means secured with respect to said main bracket means and secured with respect to said bumper assembly and adapted to exert force on said bumper assembly for urging movement thereof toward the retracted position, said biasing means adapted to urge movement of said bumper assembly to the retracted position responsive to movement of said main bracket means to the downwardly inclined position, and wherein responsive to the extended rear support bed being in the downwardly inclined position, the gravitational force exerted upon said bumper assembly is less than the force exerted thereupon by said biasing means to facilitate movement of said bumper assembly to the retracted position.

2. A retractable safety bumper apparatus for use with a vehicle having an extended rear support bed movable between a horizontal position for transport and a downwardly inclined position for loading and unloading as defined in claim 1 wherein said biasing means comprises a main spring means attached with respect to said main bracket means and attached with respect to said bumper assembly to urge said bumper assembly to pivot toward the retracted position thereof extending longitudinally beneath the extended rear support bed and thereadjacent.

3. A retractable safety bumper apparatus for use with a vehicle having an extended rear support bed movable between a horizontal position for transport and a downwardly inclined position for loading and unloading as defined in claim 2 further comprising an adjustment means operatively connected to said main spring means for controlling the force exerted therefrom.

4. A retractable safety bumper apparatus for use with a vehicle having an extended rear support bed movable between a horizontal position for transport and a downwardly inclined position for loading and unloading as defined in claim 3 wherein said adjustment means is positioned between said main spring means and said bumper assembly to facilitate varying the relative positioning therebetween to provide adjustment of the force exerted by said main spring means between said main bracket means and said bumper assembly.

5. A retractable safety bumper apparatus for use with a vehicle having an extended rear support bed movable between a horizontal position for transport and a downwardly inclined position for loading and unloading as defined in claim 1 wherein, responsive to the extended rear support bed being in the horizontal position, the gravitational force exerted upon said bumper assembly is greater than the force exerted thereupon by said biasing means to facilitate movement of said bumper assembly to the deployed position.

6. A retractable safety bumper apparatus for use with a vehicle having an extended rear support bed movable between a horizontal position for transport and a downwardly inclined position for loading and unloading as defined in claim 1 wherein said main bracket means further includes:

A. a base section mounted to the extended rear support bed;

B. a first side panel secured to said base section and extending downwardly therefrom; and C. a second side panel secured to said base section at a location spatially distant from said first side panel and extending downwardly therefrom, said first side panel and said second side panel defining a pivotal zone means therebetween to retain said bumper assembly therewithin pivotally movably attached with respect thereto.

7. A retractable safety bumper apparatus for use with a vehicle having an extended rear support bed movable between a horizontal position for transport and a downwardly inclined position for loading and unloading as defined in claim 6 wherein said first side panel defines a first aperture means therewithin and wherein said second side panel defines a second aperture means therewithin.

8. A retractable safety bumper apparatus for use with a vehicle having an extended rear support bed movable between a horizontal position for transport and a downwardly inclined position for loading and unloading as defined in claim 7 wherein said main bracket means includes a pivot pin means mounted extending through said first aperture means and through said second aperture means to facilitate pivotal mounting of said bumper assembly with respect to said main bracket means.

9. A retractable safety bumper apparatus for use with a vehicle having an extended rear support bed movable between a horizontal position for transport and a downwardly inclined position for loading and unloading as defined in claim 8 wherein said bumper assembly is attached with respect to said pivotal pin means to facilitate pivotal relative movement thereof with respect to the extended rear support bed.

10. A retractable safety bumper apparatus for use with a vehicle having an extended rear support bed movable between a horizontal position for transport and a downwardly inclined position for loading and unloading as defined in claim 1 wherein said bumper assembly includes:

A. a bumper support arm means pivotally attached with respect to said main bracket means and extending outwardly therefrom; and B. a bumper bar means fixedly secured to said bumper support arm means to be pivotally movable therewith and extending generally horizontally beneath the extended rear support bed in order to provide underride protection therebeneath.

11. A retractable safety bumper apparatus for use with a vehicle having an extended rear support bed movable between a horizontal position for transport and a downwardly inclined position for loading and unloading as defined in claim 10 wherein said bumper support arm means includes a first bumper support arm and a second bumper support arm spatially disposed from one another and both fixedly secured to said bumper bar means to facilitate strengthening thereof particularly while in the deployed position for enhancing underride protection.

12. A retractable safety bumper apparatus for use with a vehicle having an extended rear support bed movable between a horizontal position for transport and a downwardly inclined position for loading and unloading as defined in claim 10 wherein said bumper assembly further includes a bumper support strut fixedly secured to said bumper support arm means and extending outwardly away therefrom, said bumper support strut being pivotally secured with respect to said main bracket means to provide relative pivotal movement between said bumper assembly and said main bracket means and further to facilitate movement of said bumper assembly selectively to the deployed position responsive to the exertion of gravitational forces upon said bumper assembly.

13. A retractable safety bumper apparatus for use with a vehicle having an extended rear support bed movable between a horizontal position for transport and a downwardly inclined position for loading and unloading as defined in claim 1 wherein said bumper assembly defines a bumper center of gravity which is subjected to a bumper gravitational force vector exerted vertically downwardly thereupon, and wherein said main bracket means defines a pivot means thereon for facilitating pivotal mounting of said bumper assembly relative thereto, and wherein the horizontal component of the distance between said pivot means and the bumper gravitational force vector is greater when the extended rear support bed is in the horizontal position than when the extended rear support bed is in the downwardly inclined position to facilitate movement of said bumper assembly to the deployed position responsive to the extended rear support bed being in the horizontal position and to facilitate movement of said bumper assembly to the retracted position responsive to the responsive to the extended rear support bed being in the downwardly inclined position.

14. A retractable safety bumper apparatus for use with a vehicle having an extended rear support bed movable between a horizontal position for transport and a downwardly inclined position for loading and unloading as defined in claim 13 wherein the horizontal component of the distance between said pivot means and the bumper gravitational force vector is defined as the gravitation force moment arm and wherein said gravitation force moment arm increases in length as the extended rear support bed moves from the downwardly inclined position toward the horizontal position to facilitate pivotal movement of said bumper assembly toward the deployed position thereof for providing underride protection.

15. A retractable safety bumper apparatus for use with a vehicle having an extended rear support bed movable between a horizontal position for transport and a downwardly inclined position for loading and unloading as defined in claim 6 wherein said bumper assembly includes a deployed stop surface means which is brought into abutment with respect to said base section of said main bracket means responsive to movement of said bumper assembly to the deployed position for strengthening of holding of said bumper assembly in the deployed position.

16. A retractable safety bumper apparatus for use with a vehicle having an extended rear support bed movable between a horizontal position for transport and a downwardly inclined position for loading and unloading as defined in claim 1 wherein said bumper assembly includes a retracted stop surface means which is brought into abutment with respect to the extended rear support bed responsive to movement of said bumper assembly to the retracted position for strengthening of holding of said bumper assembly in the retracted position.

17. A retractable safety bumper apparatus for use with a vehicle having an extended rear support bed movable between a horizontal position for transport and a downwardly inclined position for loading and unloading, said retractable safety bumper apparatus comprising:

A. a main bracket means fixedly secured to the extended rear support bed of the vehicle and extending downwardly therefrom, said main bracket means being movable with the extended rear support bed between a horizontal position thereof and a downwardly inclined position thereof, said main bracket means further including:
  (1) a base section mounted to the extended rear support bed;
  (2) a first side panel secured to said base section and extending downwardly therefrom, said first side panel defining a first aperture means therewithin;
  (3) a second side panel secured to said base section at a location spatially distant from said first side panel and extending downwardly therefrom, said second side panel defining a second aperture means therewithin, said first side panel and said second side panel together defining a pivotal zone means therebetween;
  (4) a pivot pin means mounted extending through said first aperture means and through said second aperture means to facilitate pivotal movement relative thereto;

B. a bumper assembly pivotally mounted with respect to said main bracket means to be pivotally movable with respect thereto between a deployed position extending downwardly and away therefrom and a retracted position extending longitudinally adjacent therebeneath, said bumper assembly adapted to pivot to the deployed position responsive to positioning of said main bracket means in the horizontal position, said bumper assembly being pivotally movably mounted with respect to said main bracket means within said pivotal zone means defined between said first side panel and said second side panel, said bumper assembly being attached with respect to said pivot pin means to facilitate pivoting movement thereof with respect to said main bracket means; and C. a biasing means secured with respect to said main bracket means and secured with respect to said bumper assembly and adapted to exert force on said bumper assembly for urging movement thereof toward the retracted position, said biasing means adapted to urge movement of said bumper assembly to the retracted position responsive to movement of said main bracket means to the downwardly inclined position, said biasing means comprising a main spring means attached with respect to said main bracket means and attached with respect to said bumper assembly to urge said bumper assembly to pivot toward the retracted position thereof extending longitudinally beneath the extended rear support bed and thereadjacent.

18. A retractable safety bumper apparatus for use with a vehicle having an extended rear support bed movable between a horizontal position for transport and a downwardly inclined position for loading and unloading, said retractable safety bumper apparatus comprising:

A. a main bracket means fixedly secured to the extended rear support bed of the vehicle and extending downwardly therefrom, said main bracket means being movable with the extended rear support bed between a horizontal position thereof and a downwardly inclined position thereof, said main bracket means further including:
  (1) a base section mounted to the extended rear support bed;
  (2) a first side panel secured to said base section and extending downwardly therefrom, said first side panel defining a first aperture means therewithin;
  (3) a second side panel secured to said base section at a location spatially distant from said first side panel and extending downwardly therefrom, said second side panel defining a second aperture means therewithin, said first side panel and said second side panel together defining a pivotal zone means therebetween;
  (4) a pivot pin means mounted extending through said first aperture means and through said second aperture means to facilitate pivotal movement relative thereto;

B. a bumper assembly pivotally mounted with respect to said main bracket means to be pivotally movable with respect thereto between a deployed position extending downwardly and away therefrom and a retracted position extending longitudinally adjacent therebeneath, said bumper assembly adapted to pivot to the deployed position responsive to positioning of said main bracket means in the horizontal position, said bumper assembly being pivotally movable mounted with respect to said main bracket means within said pivotal zone means defined between said first side panel and said second side panel, said bumper assembly being attached with respect to said pivot pin means to facilitate pivoting movement thereof with respect to said main bracket means, said bumper assembly being urged to move to the deployed position by gravitational force exerted thereupon responsive to movement of the extended rear support bed to the horizontal position, said bumper assembly including:
  (1) a bumper support arm means pivotally attached with respect to said main bracket means and extending outwardly therefrom;
  (2) a bumper bar means fixedly secured to said bumper support arm means to be pivotally movable therewith and extending generally horizontally beneath the extended rear support bed in order to provide underride protection therebeneath;
  (3) a bumper support strut fixedly secured to said bumper support arm means and extending outwardly away therefrom, said bumper support strut being pivotally secured with respect to said main bracket means to provide relative pivotal movement between said bumper assembly and said main bracket means and further to facilitate movement of said bumper assembly selectively to the deployed position responsive to the exertion of gravitational forces upon said bumper assembly;

C. a biasing means secured with respect to said main bracket means and secured with respect to said bumper assembly and adapted to exert force on said bumper assembly for urging movement thereof toward the retracted position, said biasing means adapted to urge movement of said bumper assembly to the retracted position responsive to movement of said main bracket means to the downwardly inclined position, said biasing means comprising a main spring means attached with respect to said main bracket means and attached with respect to said bumper assembly to urge said bumper assembly to pivot toward the retracted position thereof extending longitudinally beneath the extended rear support bed and thereadjacent, and wherein, responsive to the extended rear support bed being in the downwardly inclined position, the gravitational force exerted upon said bumper assembly is less than the force exerted thereupon by said biasing means to facilitate movement of said bumper assembly to the retracted position, and wherein, responsive to the extended rear support bed being in the horizontal position, the gravitational force exerted upon said bumper assembly is greater than the force exerted thereupon by said biasing means to facilitate movement of said bumper assembly to the deployed position; and D. an adjustment means operatively connected to said main spring means for controlling the force exerted therefrom, said adjustment means being positioned between said main spring means and said bumper assembly to facilitate varying the relative positioning therebetween to provide adjustment of the force exerted by said main spring means between said main bracket means and said bumper assembly.

* * * * *